United States Patent [19]
Maroschak

[11] 3,897,090
[45] July 29, 1975

[54] CORRUGATED PLASTIC PIPE WITH INTEGRALLY FORMED COUPLER

[75] Inventor: Ernest J. Maroschak, Roseboro, N.C.

[73] Assignee: Plastic Tubing, Inc., Roseboro, N.C.

[22] Filed: May 19, 1972

[21] Appl. No.: 254,934

[52] U.S. Cl. ............ 285/260; 61/11; 138/121; 285/DIG. 4; 285/DIG. 22
[51] Int. Cl.² ........................................ F16L 31/00
[58] Field of Search ........ 285/260, DIG. 22, DIG. 4, 285/238, 239, 424, 423, 237; 138/121, 122, 120, 109; 61/11

[56] References Cited
UNITED STATES PATENTS

| | | | |
|---|---|---|---|
| 1,049,542 | 1/1913 | Smith | 285/DIG. 4 X |
| 2,537,284 | 1/1951 | Schuder | 285/DIG. 22 X |
| 2,650,114 | 8/1953 | Epstein | 285/424 X |
| 3,188,586 | 6/1965 | Martin et al. | 138/122 X |
| 3,239,254 | 3/1966 | Campbell | 285/424 X |
| 3,471,179 | 10/1969 | Sixt | 285/260 X |
| 3,669,473 | 6/1972 | Martin et al. | 285/DIG. 4 X |
| 3,695,643 | 10/1972 | Schmunk | 285/423 X |

FOREIGN PATENTS OR APPLICATIONS

| | | | |
|---|---|---|---|
| 1,247,652 | 10/1960 | France | 285/260 |
| 352,204 | 3/1961 | Switzerland | 285/238 |
| 928,911 | 6/1963 | United Kingdom | 285/260 |

*Primary Examiner*—Thomas F. Callaghan
*Attorney, Agent, or Firm*—Parrott, Bell, Seltzer, Park & Gibson

[57] ABSTRACT

A corrugated plastic pipe with a coupler integrally formed at one end thereof for releasable connection with the opposite end of another like pipe and wherein the coupler is in the form of an annular collar with a plurality of latching members formed integrally therewith and extending inwardly and adapted to engage the rib of an interconnected pipe for releasable connection therewith.

8 Claims, 10 Drawing Figures

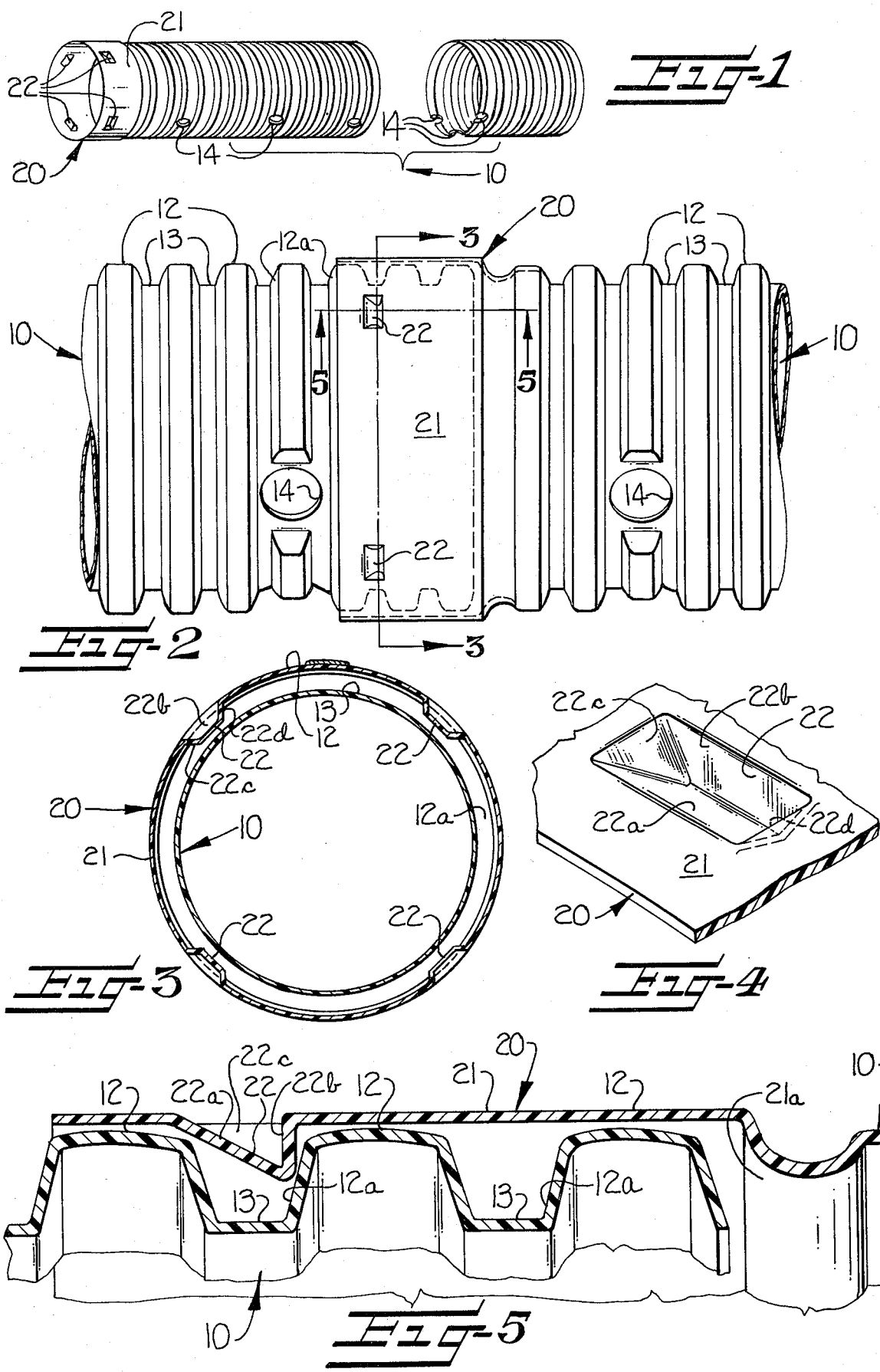

CORRUGATED PLASTIC PIPE WITH INTEGRALLY FORMED COUPLER

This invention relates to corrugated pipes and more particularly to corrugated resilient plastic pipes wherein coupling means are integrally formed on one end of the pipe for releasably interconnecting with the opposite end of another like pipe.

Heretofore, it has been the practice to interconnect corrugated plastic pipe by separate coupler elements and, as far as can be determined, no one heretofore has provided corrugated plastic pipe with coupler means integrally formed therewith for readily interconnecting the pipe when installing the same in the field.

It is therefore the primary object of this invention to avoid the need for a separate coupler element in interconnecting plastic corrugated pipe by providing a coupler integrally formed with one end of the corrugated pipe.

It is a more specific object of the invention to form a coupler integral with one end of a plastic orrugated pipe and wherein the coupler has a plurality of latching members extending inwardly therefrom for releasably engaging one or more ribs on the end of another like pipe positioned therein.

It is a further more specific object of the invention to provide a coupler integrally formed on the end of a corrugated plastic pipe wherein the walls of the pipe and the coupler are of thin wall construction for inparting the desired resiliency to the pipe and wherein the length of the coupler is adapted to receive therewithin several ribs of another pipe to serve for defining a reinforced pipe connection and to aid in resisting the releasement of the connection when installing the interconnected pipe in a ditch, for example.

Some of the objects and advantages of the invention having been stated, others will appear when taken in connection with the accompanying drawings, in which:

FIG. 1 is a perspective view with parts broken away of a first embodiment of the invention;

FIG. 2 is a fragmentary elevation view of an interconnected pipe;

FIG. 3 is a transverse sectional view taken along line 3—3 of FIG. 2; illustrating the arrangement of the latching members of the coupler;

FIG. 4 is a fragmentary perspective view of one of the latching members;

FIG. 5 is an enlarged fragmentary vertical sectional view taken substantially along line 5—5 of FIG. 2 and illustrating the manner in which each of the latching members releasably engage with a rib of an interconnected pipe;

Figure 6:
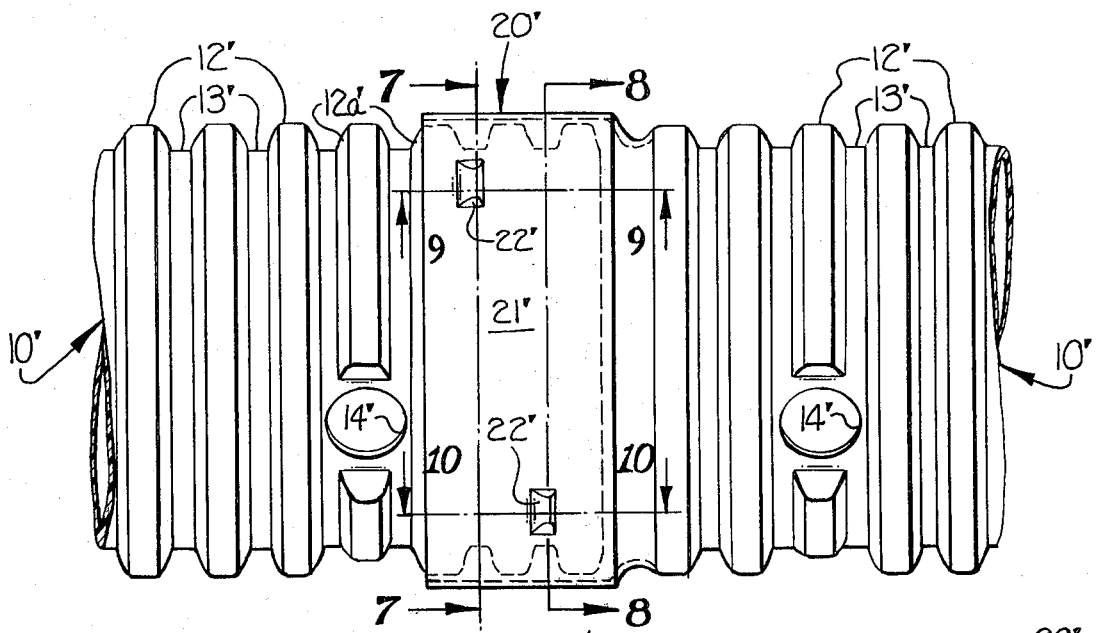
FIG. 6 is a fragmentary elevational view of a second embodiment of the invention.

Referring now more specifically to the drawings, particularly the first form of the invention illustrated in FIGS. 1 to 5, reference numeral 10 broadly indicates a molded corrugated resilient plastic pipe formed of polyethylene, for example, and wherein a coupler, broadly indicated by reference numeral 20, is integrally molded on one end of the pipe and wherein the remainder of the pipe is defined by spaced apart successive annular ribs 12 with annular valley portions 13 therebetween. The plastic pipe illustrated in the drawings is shown in the form of a drainage pipe and to this end, groups of three arcuately arranged openings 14 are provided at longitudinally spaced locations substantially throughout the lower half of the pipe.

Referring now more specifically to the construction of the coupler 20, it will be noted that the coupler comprises an annular collar 21 having an inner diameter greater than the outer diameter of the ribs 12 and, as illustrated, is of a length so as to receive therein a plurality of ribs 12 of a connecting pipe. Integrally formed with said collar 21 and extending inwardly around the interior of the collar are a plurality of latching members 22 illustrated as four in number and preferably being uniformly spaced apart and circularly arranged in series for releasably interconnecting with a common rib of another like pipe.

Preferably, the annular collar is of such length as to receive therein three ribs of an interconnected pipe with two of the ribs being positioned between the latching members 22 and the innermost longitudinal extent of the collar as defined by inwardly extending annular shoulder 21a which serves as an abutment stop for a connecting pipe. By this arrangement, it is apparent that two ribs are positioned behind the latching members so that in the event the first rib engaging the latching member is inadvertently moved outwardly beyond the latching member, there is another rib insuring an interconnection of the pipes. It has also been determined that this arrangement serves for reinforcing the annular collar so as to withstand compressive forces applied thereto.

Referring now specifically to FIG. 3, it will be noted that the radial distance from the inner end of each latching member 22 to the axis of the collar 21 is less than the radius of the ribs 12 and that collectively the inner ends of the series of latching members define an imaginary circle of a diamter less than the outer diameter of the ribs 12. Thus, as illustrated, each of the latching members 22 engage a side wall portion 12a of a common rib 12. It will be further noted that the four latching members 22 are illustrated as being substantially 90° apart from each other and thus may be viewed as opposing pairs of latching members engaging wall portions 12a of the rib 12 at uniformly spaced apart areas substantially 90° apart from each other.

Referring now more specifically to the construction of the latching members 22, as already noted, the latching members 22 are integrally formed with the collar 21. As best illustrated in FIGS. 2 and 5, each of the latching members 22 has a first pair of opposing uninterrupted walls 22a and 22b and a second pair of opposing uninterrupted walls 22c and 22d with the second pair of walls arranged to connect opposite sides of the first pair of walls for imparting additional rigidity thereto. As best illustrated in FIG. 5, wall 22a slopes inwardly away from the outer end of the collar 21 and toward the axis of the collar so as to serve as a cam surface for facilitating passage of ribs 12 inwardly for interconnecting an adjacent pipe. The opposing wall 22b extends substantially normal; e.g., within about 15°, to the axis of the collar 21 and is adapted to engage the side 12a of rib 12 for resisting outward movement of the rib to thus assure effecting a good interconnection.

It has been determined that this construction of the latching members 22 imparts the desired rigidity to the latching members for effecting their gripping function of the walls 12a of a rib 12 and at the same time due to the relatively thin nature of the wall of the annular collar 21 the latching members may be flexed outwardly so as to facilitate the positioning of the pipe to be connected within the collar 21.

Referring now to the second embodiment of the invention, as illustrated in FIGS. 6 to 10, the same reference numerals with the prime notation added have been employed for identifying the various elements of the invention. It will be noted that this embodiment of the invention differs from the first only in the arrangement of the latching members 22' and therefore only this difference will be commented upon.

Figure 7:
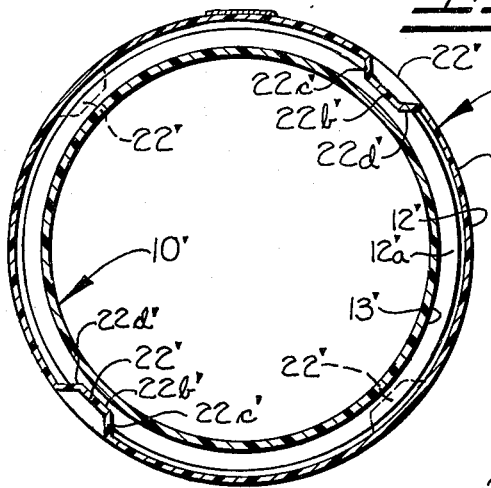
FIG. 7 is a transverse sectional view taken along line 7—7 of FIG. 6.
Figure 8:
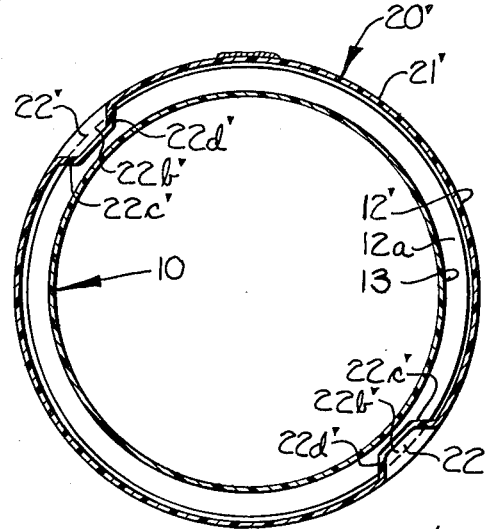
FIG. 8 is another transverse sectional view taken along line 8—8 of FIG. 6.
Figure 9:
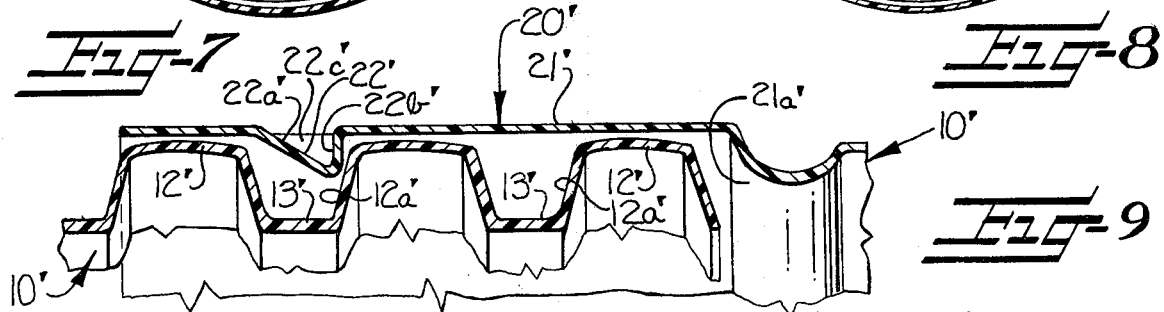
FIG. 9 is an enlarged fragmentary vertical sectional view taken along line 9—9 of FIG. 6.
Figure 10:
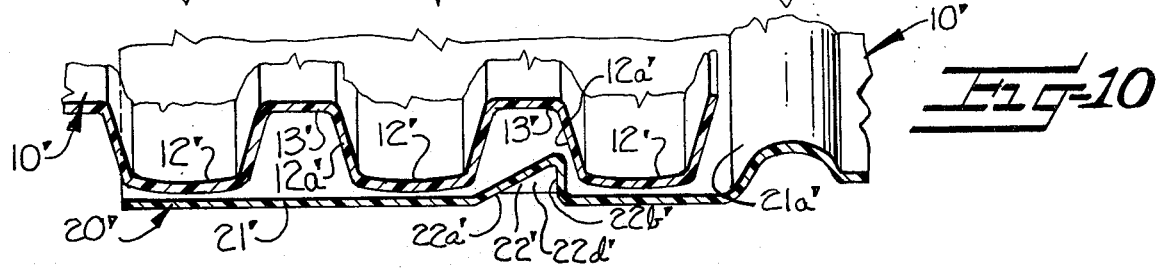
FIG. 10 is another enlarged fragmentary vertical sectional view taken along line 10—10 in FIG. 6.

As best shown in FIGS. 6 and 7, the latching members 22' are arranged in opposing pairs substantially 90° from each other, with each pair defining a circular arranged series and the pairs being longitudinally spaced apart by a distance substantially equal to the width of one rib 12 and one valley portion 13 so as to engage the side walls 12a' of two adjacent ribs 12', as best illustrated in FIGS. 9 and 10.

As will be noted, one pair of latching members 22' is positioned closer to the outer end of annular collar 21' than is the other pair of latching members with the result the outer pair of latching members, as best shown in FIG. 7, engages opposite portions of the side wall 12a' of rib 12' which is medially positioned within the collar 21'. The innermost pair of latching members 22' engages opposite portions of the side wall 12a of the innermost rib 12' at locations substantially 90° from the first pair.

It will thus be seen that both embodiments of the invention provide a coupler integrally formed with the end of the plastic pipe so as to facilitate interconnecting of pipes and the installation thereof in the field.

In the drawings and specification there have been set forth preferred embodiments of the invention and, although specific terms are employed, they are used in a generic and descriptive sense only and not for purposes of limitation.

That which is claimed is:

1. An elongate corrugated resilient plastic drainage pipe having spaced-apart successive annular ribs with annular valley portions therebetween extending from adjacent one end portion of the pipe and throughout the remainder of the pipe, and coupling means integrally formed with said pipe and defining said one end portion thereof and adapted for releasable connection with the opposite end of another like pipe, said coupling means comprising an annular collar having an inner diameter greater than the outer diameter of said ribs and having an inwardly extending annular shoulder defining the inner end of the collar and serving as an abutment stop for a connecting pipe, said collar being of a length so as to receive therein at least one rib of a connecting pipe, a plurality of spaced latching members integrally formed with said collar and extending inwardly around the interior of said collar, the radial distance from the inner end of each latching member to the axis of the collar being less than the radius of said ribs, each of said latching members having at least a first pair of opposing uninterrupted walls integrally formed with said collar, one of said walls sloping inwardly away from the outer end of the collar and toward the axis of the collar and serving as a cam surface for facilitating interconnecting of pipes, and the opposing wall extending substantially normal to the axis of the collar and adapted to engage the side of a rib of an interconnected pipe for resisting the releasement thereof.

2. A corrugated resilient plastic drainage pipe in accordance with claim 1, wherein said plurality of latching members are circularly arranged around the interior of the collar to engage the same rib of a connected pipe.

3. A corrugated resilient plastic drainage pipe in accordance with claim 1, wherein said collar is of a length so as to receive therein a plurality of ribs of a connecting pipe, and wherein said plurality of latching members are arranged in opposing pairs, with the pairs being angularly disposed relative to each other about the axis of said collar, one of said pair of opposing latching members being positioned closer to the outer end of the collar than another opposing pair by a distance substantially equal to the width of one rib and one valley portion for permitting two adjacent ribs of a connected pipe to be engaged by the pairs of latching members.

4. A corrugated resilient plastic drainage pipe in accordance with claim 1 wherein each of said latching members has a second pair of opposing uninterrupted walls integrally formed with said collar and which connect opposite sides of said first pair of opposing walls for imparting additional rigidity thereto.

5. A corrugated resilient plastic drainage pipe in accordance with claim 1 wherein said latching members comprise four latching members substantially equally spaced apart from each other around the interior of said collar.

6. An elongate corrugated resilient plastic drainage pipe having spaced apart successive annular ribs with annular valley portions therebetween extending from adjacent one end portion of the pipe and throughout the remainder of the pipe, and coupling means integrally formed with said pipe and defining said one end portion thereof and adapted for releasable connection with the opposite end of another like pipe, said coupling means comprising an annular collar having an inner diameter greater than the outer diameter of said ribs and having an inwardly extending annular shoulder defining the inner end of the collar and serving as an abutment stop for a connecting pipe, said collar being of a length so as to receive therein a plurality of ribs of a connecting pipe, a circularly arranged series of spaced latching members integrally formed with said collar adjacent the outer end of the collar and extending inwardly from the inner surface of said collar, said series of latching members having their inner ends defining an imaginary circle of a diameter less than the outer diameter of said ribs, each of said latching members having at least a first pair of opposing uninterrupted walls integrally formed with said collar, one of said walls sloping inwardly away from the outer end of the collar and toward the axis of the collar and serving as a cam surface for facilitating interconnecting of pipes, and the opposing wall extending substantially normal to the axis of the collar and adapted to engage the side of a rib of an interconnected pipe for resisting the releasement thereof.

7. A corrugated resilient plastic drainage pipe in accordance with claim 6 wherein the distance from said annular shoulder to said series of latching members is at least as great as the collective width of two ribs and one valley portion.

8. An elongate corrugated resilient plastic drainage pipe having spaced apart successive annular ribs with annular valley portions therebetween extending from adjacent one end portion of the pipe and throughout the remainder of the pipe, and coupling means integrally formed with said pipe and defining said one end portion thereof and adapted for releasable connection with the opposite end of another like pipe, said coupling means comprising an annular collar having an inner diameter greater than the outer diameter of said ribs and being of a length so as to receive therein a plurality of ribs of a connecting pipe, and a circularly arranged series of spaced latching members integrally formed with said collar adjacent the outer end of the collar and extending inwardly from the inner surface of said collar, said series of latching members having their inner ends defining an imaginary circle of a diameter less than the outer diameter of said ribs.

* * * * *